Jan. 6, 1970
JAMES E. WEBB  
ADMINISTRATOR OF THE NATIONAL AERONAUTICS  
AND SPACE ADMINISTRATION  
ANTI-GLARE IMPROVEMENT FOR OPTICAL IMAGING SYSTEMS
Filed March 19, 1968
3,488,103
2 Sheets-Sheet 1
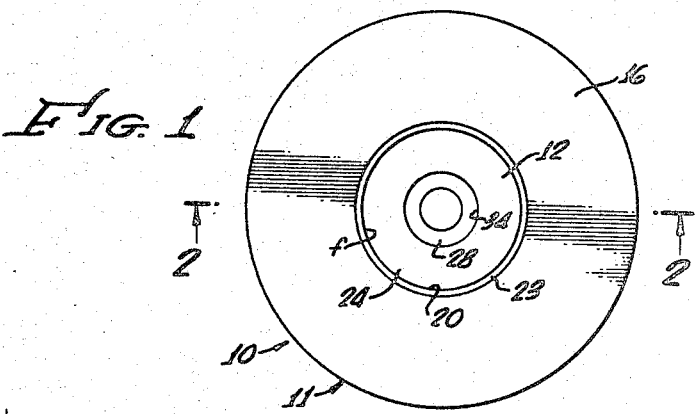
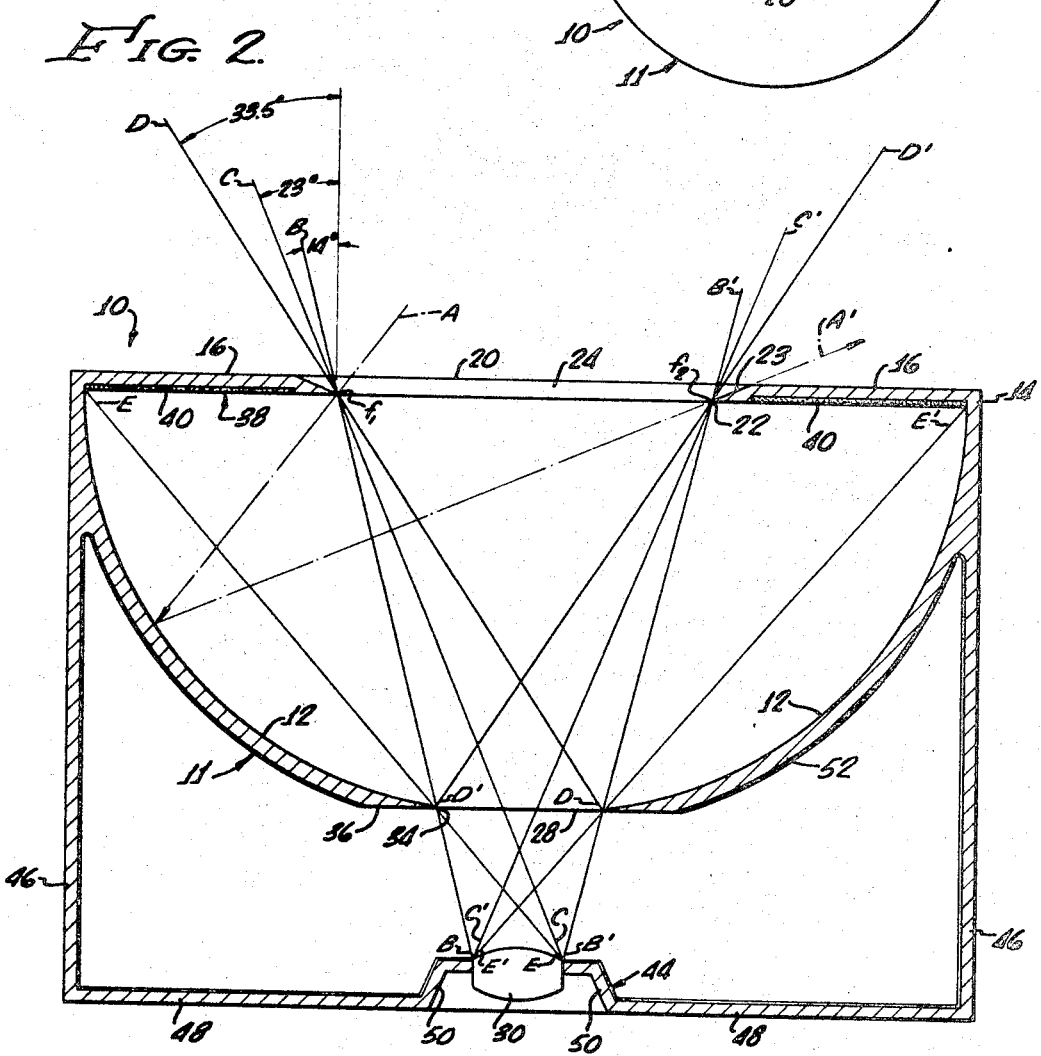
INVENTOR.  
EDGAR S. DAVIS  
BY  
ATTORNEYS.

Jan. 6, 1970    JAMES E. WEBB    3,488,103
ADMINISTRATOR OF THE NATIONAL AERONAUTICS
AND SPACE ADMINISTRATION
ANTI-GLARE IMPROVEMENT FOR OPTICAL IMAGING SYSTEMS
Filed March 19, 1968    2 Sheets-Sheet 2
FIG. 3.
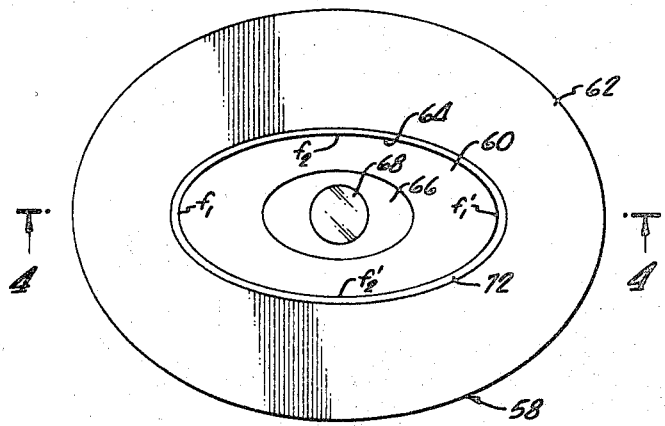
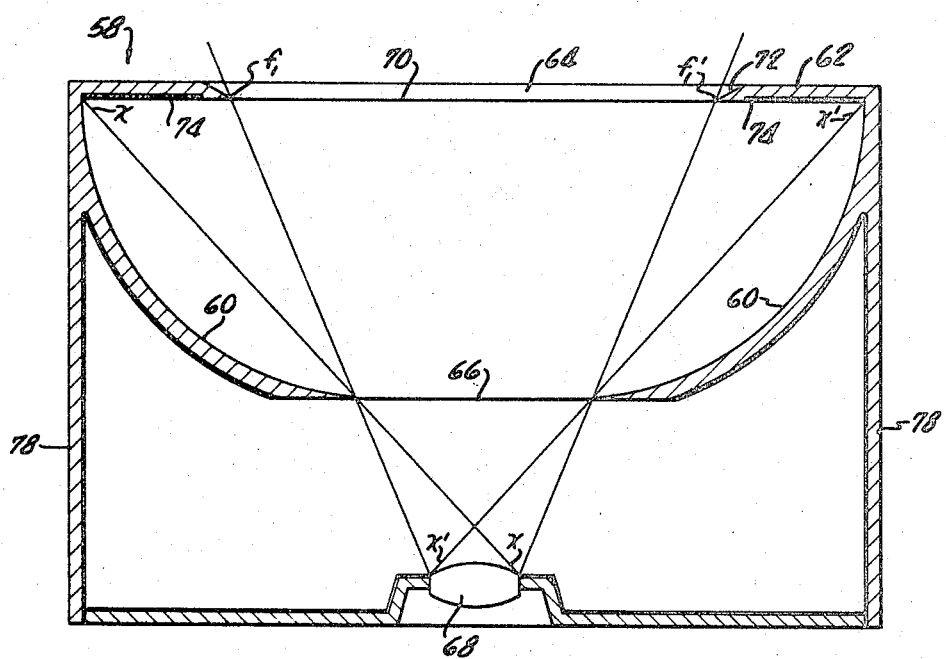
FIG. 4.
INVENTOR.
EDGAR S. DAVIS
BY
ATTORNEYS.

United States Patent Office 3,488,103
Patented Jan. 6, 1970

3,488,103
ANTI-GLARE IMPROVEMENT FOR OPTICAL
IMAGING SYSTEMS
James E. Webb, Administrator of the National Aeronautics and Space Administration, with respect to an invention of Edgar S. Davis, La Canada, Calif.
Filed Mar. 19, 1968, Ser. No. 714,296
Int. Cl. G03b 11/04; G02b 21/06; G02f 1/30
U.S. Cl. 350—58                                    3 Claims

ABSTRACT OF THE DISCLOSURE

An anti-glare baffle having a specularly reflective surface formed from an oblate hemispheroid. A shading flange extends inwardly from the upper edge of the hemispheroid and intersects the foci of the oblate hemispheroid. The oblate hemispheroid and flange surround a viewing aperture and spaced ray detecting device.

ORIGIN OF THE INVENTION

The invention described herein was made in the performance of work under a NASA contract and is subject to the provisions of Section 305 of the National Aeronautics and Space Act of 1958, Public Law 85-568 (72 Stat. 435; 42 USC 2457).

BACKGROUND OF THE INVENTION

Light shades are frequently employed for sensitive still and movie cameras, light meters, telescopes, commercial or scientific radiometers, photometers, electro-optical position sensors, photocell shades, and other applications which require the observation of light emanating from a predetermined field. These devices are particularly important for use with electro-optical position sensors such as star sensors for use in lunar and planetary exploration. With such star tracking devices interfering sources of illumination such as the sun, other planets, and other stars must be prevented from illuminating the lens of the position sensor. It is extremely critical with these devices that the glare from interfering sources of illumination be held to a minimum since the illumination from such sources may be $10^6$ to $10^{12}$ times the intensity of the star being tracked. It is important that glare from sources of illumination out of the desired range of view be held to a minimum for the other applications mentioned as well.

While multiple baffles and singular baffles have been devised for use in eliminating glare from extraneous sources of light, they have usually not been effective since some specular and diffuse reflection still normally impinge on the shaded lens. For those baffles which are most effective, the desired area of view may be partially blocked by the baffle.

Thus there is a need for a light baffle which is effective in reducing glare from light sources out of the desired field of view and which permits maximum acceptance of the light rays emanating from within the field of view.

SUMMARY OF THE INVENTION

This invention is directed to an anti-glare baffle for shading rays such as light rays or other radiant energy rays which emanate from outside a desired field of view. The baffle includes a shell having the configuration of an oblate hemispheroid. A specularly reflective surface is provided on the inside of the shell for specularly reflecting rays which impinge thereon. An aperture is provided in the upper horizontal surface of the hemispheroid by extending a flange surface inwardly from the upper edge of the shell by a distance sufficiently great to intersect the foci of the hemispheroid. The aperture thus is defined by all the foci of the hemispheroid. With this configuration of a baffle, it has been found that rays which enter the baffle through the aperture or through the foci at the edge of the aperture and which impinge on the reflective surface are specularly reflected out of the baffle. A viewing aperture is provided at the central portion of the reflective surface for permitting passage of rays emanating from within the desired field of view.

The baffle may also include a means for mounting a ray detecting means such as a lens at a predetermined spaced distance from the reflective surface so that no portion of the specularly reflective surface is visible to the lens.

The term oblate spheroid or oblate hemispheroid as used herein means a spheroid or hemispheroid having major and minor axes which are elliptical or semielliptical in cross-sectional configuration. Thus the term oblate hemispheroid includes both hemiellipsoids and surfaces of revolution formed by rotating semiellipses about their minor axes.

The reflective surface may be formed from a surface of revolution whose generatrix is a semiellipse and line segments extending from its opposite ends to the foci thereof. The shell may also be formed from hemiellipsoids having flanges extending inwardly from their upper edges and forming an elliptical curve which intersects the foci of the semiellipse.

One feature of the baffle constructed in accordance with this invention is that light rays emanating from outside the desired field of view are not reflected within the baffle so that diffuse reflections or glare therefrom can impinge upon the surface of the viewing lens thereof.

Another feature of the baffle of this invention is that it's easily adapted to various lens configurations and sizes for limiting the field of view to a desired angle.

Yet another feature of the baffle constructed in accordance with this invention is that it has total effectiveness and reliability in shading rays which emanate from a relatively small angle beyond the desired field of view without interfering with rays emanating from within the desired field of view.

BRIEF DESCRIPTION OF DRAWINGS

FIGURE 1 is a plan view of a light baffle constructed in accordance with this invention;

FIGURE 2 is a transverse sectional view of the light baffle of FIGURE 1 taken substantially along line 2—2;

FIGURE 3 is a plan view of another embodiment of the light baffle in accordance with this invention; and FIGURE 4 is a transverse sectional view of the light baffle of FIGURE 3 taken substantially along line 4—4.

DESCRIPTION OF THE PREFERRED EMBODIMENTS

The light baffle 10 as shown in FIGURES 1 and 2 comprises an oblate hemispheroid shell 11 having an inwardly directed specularly reflective surface 12. The shell 11 is connected at its upper edge 14 to an inwardly extending annular flange 16 which shades the specularly reflective, retrodirective surface 12 and extends inwardly for a distance sufficient to intersect the foci of the oblate hemispheroid. The upper inner edge 20 of the flange is connected to the annular lower edge 22 by means of an inclined annular surface 23 which terminates at the foci of the oblate hemispheroid along the lower edge 22. The lower inner edge 22 of the flange is sharp so that it approximates a plurality of points which define the foci of the reflective surface 12. The inner edge 22 also defines an annular aperture 24 as the entrance to the baffle.

The light baffle 10 of FIGURES 1 and 2 takes advantage of a unique property of the oblate hemispheroid shell 11. This property is that any light which enters the oblate hemispheroid intermediate its foci will be specularly reflected out of the baffle intermediate the foci thereof. This follows since it is true that if a light ray impinges on a specularly reflective elliptical surface after passing through one focus it will be reflected out through another focus and any ray entering intermediate the foci of the ellipse will be reflected specularly out intermediate the foci. For example, referring to FIGURE 2, the light ray A is shown entering through focus $f_1$ in the plane of the drawing and is specularly reflected in that same plane through focus $f_2$ along line A'. By providing a sharp edge 22 on the flange and a beveled surface 23, the incline of which corresponds substantially to the path of the light ray A', none of this light is specularly or diffusely reflected into the baffle. Any other ray which enters the baffle between $f_1$ and $f_2$ and is reflected in a specular manner due to the geometry of the reflective surface leaves the baffle intermediate the foci $f_1$ and $f_2$.

An oblate hemispheroid shell such as shell 11 is semi-elliptical in cross-section so that a ray which enters the baffle through the aperture 24 and contacts the surface 12 will be specularly reflected back through the circular aperture. It has been determined that any ray which enters the aperture 24 in the light baffle of FIGURE 1 and impinges on surface 12 leaves the baffle through the aperture 24 intermediate the locus of the foci so that no rays are trapped behind the flange 12. A second aperture 28 is provided at the base of the oblate shell 11 so that light from the desired field of view which enters the light baffle passes through the aperture 28 at the base of the baffle and light rays from outside the desired field of view are specularly reflected back out through the aperture 24.

A lens 30 may be mounted in the optical system in spaced relationship with the aperture 28 as shown in FIGURE 2. The lens 30 is preferably situated behind the aperture 28 so that the specularly reflective oblate spheroidal surface 12 is not visible to the lens. The size of the aperture 28 and the size and distance of the lens 30 behind the specularly reflective surface 12 are determined by the angle of the field of view which is desired to be observed by the optical system. For example, as shown in FIGURE 2, the lens is mounted behind the specularly reflective surface 12 so that it observes directly a field of view having a half angle of 14° and the baffle is totally effective for a half angle of greater than 33.5°.

To construct a practical device which is effective for all rays emanating from a field of view of greater than 33.5° half angle, a field of view of 14° half angle with an appropriate lens 30 is first delineated in a plane of the drawing as shown by lines B—B and B'—B' from the edges of lens 30 in FIGURE 2. The first stray light field of view is then selected by choosing an appropriate angle such as the 23° angle shown in FIGURE 2.

The first stray light field of view may be defined as stray light emanating from outside the half angle of the lens which will impinge on the surface of the lens. This first stray light field of view can be controlled by varying the baffle configuration. The first stray light field of view is located by constructing straight line light ray paths which are inclined inwardly toward the lens axis from the edge of the lens by the selected number of degrees such as lines C—C and C'—C' of FIGURE 2. The intersections of rays C—C or C'—C' with B—B or B'—B' define the foci of an ellipse which will provide the desired shade characteristics.

The minor axis of the ellipse is made as large as possible within the constraint that the lens 30 (or other light detecting device) does not receive direct illumination from the surface 12. For example straight ray paths E—E and E'—E' of FIGURE 2 show that no portion of the surface 12 is visible to the lens 30. The minor axis can be easily determined by a process of "cut and try." Knowing the foci, determination of the minor axis defines the ellipse and its major axis. Determining the minor axis also determines the half angle beyond which the baffle is totally effective i.e. 33.5° in the example shown in FIGURES 1 and 2.

The three dimensional shell 11 is defined by using the constructed semi-ellipse and line segments to the foci as a generatrix and rotating it about its minor axis, the vertically extending axis of the planar ellipse of FIGURE 2. Thus the baffle constructed in accordance with FIGURES 1 and 2 is an oblate hemispheroid which is a surface of revolution.

The baffle 10 may be constructed from aluminum or other metal or plastic by spinning on an appropriate die, by casting or, injection molding.

By defining the specularly reflective surface configuration of the baffle 10 according to the foregoing, the lens 30 is situated so that no portion of the reflective surface is visible. Best results are obtained by constructing the inner edge 34 of the aperture 28 with a beveled surface 36 to approximate a series of points.

The back or inwardly directed surface 38 of the flange 16 is the only portion of the baffle visible by the lens. This may be coated with a minimum reflectance material 40 such as black velvet paint or coffin cloth to minimize all reflection therefrom. This surface is only illuminated by diffuse reflection from the surface 12 of the oblate hemispheroid which is held to a minimum by the choice of a specularly reflective minimum diffuse reflectance coating thereon. If any diffuse reflection occurs from the reflective surface 12 it is absorbed by the coated back 38 of the flange 16 to minimize secondary reflection into the lens.

As shown in FIGURE 2, once the baffle configuration for viewing the desired field of view has been obtained a lens support 44 may be mounted to the baffle. For example as shown in FIGURE 2, the support structure of the device of this invention may include an upstanding annular support frame 46 which entirely surrounds the baffle. The frame is preferably integrally connected with a planar lower wall 48 which includes a lens mounting portion 50 therein for mounting the lens in spaced relation with the specularly reflective surface of the light baffle. The lens may be of any configuration depending upon the desired field of view. A circular lens is the most probable configuration for use and, thus, has been referred to herein.

By using different size oblate hemispheroids, the light baffle can be adapted for use with different sizes of lenses and for shading many different fields of view.

It has been found that the baffle may be fabricated from anodized aluminum, stainless steel, nickel or any other specularly reflective material. It has also been found to be advantageous to coat the reflective surface 12 with a specularly reflective substance having a minimum diffuse reflection such as black carrara glass manufactured by Pittsburgh Plate Glass Company which has a diffuse reflectance of .003%. Other materials which may be used include gloss black anodize with a diffuse reflection of 0.3% and Laminar×500 Gloss with a diffuse reflectance of .25%. The back surface 38 of the inwardly extending flange 16 is preferably coated with a substance which has a minimum amount of total reflectance. Acceptable substances for this function include coffin cloth, 3M black velvet and parsons black. The lower surface 52 of the oblate spheroid, the inner surface of support frame 46 and the upper surfaces of the lower wall 48 and the mounting portion 50 are also preferably coated with a substance having a very low total reflectance to minimize the effect of light emanating from the region between the first stray light field of view (see lines C—C of FIGURE 2) and the angle beyond which the baffle is totally effective (see line D—D of FIGURE 2).

The entire assembly may be molded from a plastic to give gloss black finish on surface 12 with minimum diffuse reflectance. A matte or grooved finish may be molded into surfaces 38, 52, and 48 to minimize total reflectance from these surfaces.

It has been found using a light baffle constructed in accordance with FIGURES 1 and 2 from a black anodized aluminum that at least an order of magnitude of improvement was achieved over the best known light baffles of the prior art. A similar baffle with a black carrara glass surface would be even more effective.

Another embodiment of the light baffle of this invention is shown in FIGURES 3 and 4. In this embodiment, the baffle 58 has a reflective surface 60 formed from oblate spheroid which is a hemiellipsoid rather than a surface of revolution. As shown in FIGURE 3, the baffle 58 has an ellipsoidal configuration in plan view. It has been determined by graphical analysis and empirically that if a flange 62 is mounted on the upper edge of the oblate hemispheroid 58 so that its inwardly extending edge 70 passes through the foci $f_1$ and $f'_1$ of the major axis and $f_2$ and $f'_2$ of the minor axis and forms smooth curves connecting the foci so as to define an elliptical aperture 64, a baffle having the optical characteristics of that discussed with respect to FIGURES 1 and 2 will be defined. Any ray entering the baffle 58 and impinging on the specularly reflective surface 60 will be reflected out through the elliptical aperture 64.

The oblate hemispheroid of FIGURES 3 and 4 is constructed in a manner basically similar to that described with respect to FIGURES 1 and 2. In this embodiment, however, the foci along the major and minor axes in the horizontal plane of the plan view shown in FIGURE 3 are determined for the desired fields of view and the innermost edge 70 of the flange 62 connects these foci by smooth curves. The lengths of the major and minor axes and depth of the baffle are then determined in accordance with the previously explained procedure and the lens position is located so that no portion of the reflective surface is visible.

Since the reflective surface 60 is nonsymmetrical and the illustrated lens 68 is circular, the minor axis which is optimum through one set of foci of the hemiellipsoid will not be optimum for the other. For example lines X—X and X'—X' define the minor axis (or depth along the optical axis) of the surface 60. These ray paths intersect the outer edge of the flange 62. Similar ray paths in the vertical plane through $f_2$-$f'_2$ will intersect the back surface of the flange 70. While such construction will be effective as a baffle, the length of the flange can be reduced and the ray path in this plane can be the same as X—X and X'—X' if an elliptical lens is used with the minor axis of the lens aligned along the major axis of the reflective surface.

A lens aperture 66 is provided in the oblate spheroid 60; this aperture may be elliptical.

The construction of this embodiment of the light baffle, as shown in FIGURE 4, is substantially the same as that discussed with respect to FIGURES 1 and 2. For example the edge 70 of the inwardly extending flange 62 is beveled at its upper surface 72 to provide a sharp inner edge approximating a series of points. Also the inner edge of the aperture 66 at the rear of the specularly reflective surface 60 is advantageously thin approximating a series of points. The inwardly directed surfaces 74 of the flange and of the support structure 78 may be coated with a minimum total reflectance material such as coffin cloth, 3M black velvet paint, parsons black, etc. The specularly reflective surface 60 may be coated with a highly specularly reflective material such as 3M's black carrara glass.

What is claimed and desired to be secured by Letters Patent is:

1. An anti-glare baffle for shading rays which emanate from outside the desired field of view comprising:
    a shell having the configuration of an oblate hemispheroid;
    a specularly reflective surface on the inside of said shell;
    a ray shading member comprising a flange having a sharp inner edge approximating a series of points extending inwardly from the upper edge of said shell by a distance sufficiently great to terminate with the series of points of the inner edge thereof being arranged in a location adjacent the foci of said oblate hemispheroid so that rays can only enter said shell intermediate said foci or through said foci thereby causing rays which impinge on said reflective surface to be specularly reflected out of said shell;
    a viewing aperture defined within the shell at the central portion of said reflective surface for permitting the passage of rays which emanate from within said desired field of view; and
    support means operatively coupled with said shell including means for supporting ray detecting means behind said viewing aperture at a point spaced from the aperture at a distance such that no portion of said reflective surface is visible to said ray detecting means.

2. An anti-glare baffle as defined in claim 1 wherein the interior surfaces of said shading member are coated with a material having a low total diffuse and specular reflectance.

3. The anti-glare baffle according to claim 1 wherein the means for supporting the detecting means supports the detecting means to observe directly a field of view having a half angle delineated by ray paths emanating outwardly from the opposite edges of the detecting means and passing through the viewing aperture and said foci, and the first ray light field is delineated by ray paths extending inwardly from the opposite edges of the detecting means and passing through said foci.

References Cited

UNITED STATES PATENTS

| | | | |
|---|---|---|---|
| 1,775,180 | 9/1930 | Worsching | 350—58 |
| 2,665,618 | 1/1954 | Heidecke | 350—58 |
| 2,738,700 | 3/1956 | Taylor | 350—206 |
| 3,310,356 | 3/1967 | Borberg | 350—206 |
| 3,214,596 | 10/1965 | Schwerdt et al. | |

FOREIGN PATENTS 256,861  11/1949  Switzerland.

PAUL R. GILLIAM, Primary Examiner

U.S. Cl. X.R.

350—17, 65, 206, 266, 276